United States Patent [19]

Luciano

[11] 4,105,992
[45] Aug. 8, 1978

[54] ANIMAL ATTRACTION METHOD AND APPARATUS

[76] Inventor: David P. Luciano, One Renwick Pl., Ithaca, N.Y. 14850

[21] Appl. No.: 698,216

[22] Filed: Jun. 21, 1976

[51] Int. Cl.² .......................................... H04B 11/00
[52] U.S. Cl. ...................................... 340/15; 43/124; 179/15 M
[58] Field of Search .................. 340/3 A, 15; 43/17.1, 43/107, 124

[56] References Cited

U.S. PATENT DOCUMENTS

| | | | |
|---|---|---|---|
| 2,812,612 | 11/1957 | Vang | 43/124 |
| 2,861,132 | 11/1958 | Kahn et al. | 43/107 |
| 3,414,873 | 12/1968 | Richard et al. | 43/17.1 |
| 3,503,039 | 3/1970 | Aniskovicz | 43/124 |
| 3,872,472 | 3/1975 | Moschgat | 43/124 |
| 3,885,338 | 5/1975 | York | 43/17.1 |
| 3,886,493 | 5/1975 | Farr | 340/15 |

Primary Examiner—Maynard R. Wilbur
Assistant Examiner—T. M. Blum
Attorney, Agent, or Firm—Cushman, Darby & Cushman

[57] ABSTRACT

Rodents are attracted to a pre-selected location by generating ultrasonic signals having pre-determined frequencies, time durations and repetition rates which correspond to instinctual vocalization of rodents. A recording is made of the sounds generated by young rodents which recording is digitized and stored in a memory unit. The stored recording is non-destructively read out of memory and converted back to an analogue signal which substantially corresponds to the sound wave form generated by the young rodent. This signal is amplified and converted to a sound signal in an appropriate transducer for attracting rodents to a pre-determined location.

4 Claims, 3 Drawing Figures

ANIMAL ATTRACTION METHOD AND APPARATUS

BACKGROUND OF THE INVENTION

This invention relates generally to a method and apparatus for attracting rodents by generating ultrasonic signals which correspond to the instinctual vocalization of rodents.

A number of attempts have been made to control the growth of the rodent population. Initially attempts were made to eliminate rodents by the use of mechanical traps including the conventional well-known mouse trap. While these traps have been successful, there are a number of drawbacks associated therewith including the fact that such traps are only capable of catching one rodent at a time and the rapid, forced movement of the mechanical trapping lever typically associated with such mouse traps present a danger to infants and domestic animals. In order to overcome the problems presented by conventional mechanical traps chemical poisons were developed for poisoning the rodents. Such rodenticides presented a serious problem in that the chemicals therein also affected domestic animals such as dogs and cats as well as human beings. Further, the use of such chemicals resulted in a delayed action on the rodents thereby resulting in the decaying carcasses of the poisoned rodents being left behind walls or in other inaccessible areas. Such decaying carcasses resulted in an offensive odor and attracted germs, flies and other undesirable insects to the surrounding area.

Because of the aforementioned problems, political entities have established programs for eliminating the food supply of the rodents. This depends upon uniform and consistent participation of everyone within the political entity. Such programs have failed in the past because of lack of full cooperation from everyone concerned.

More recently, attempts have been made to use ultrasonic devices for driving rodents away from an area. Such devices have proved to be ineffective since in the short term, the rodents merely went into another location with resulting damage to that location, and in the long run, the rodents returned. Attracting devices have been developed such as that disclosed in U.S. Pat. No. 3,414,873 for attracting fish. The device generates frequencies which correspond to the sound frequencies of a struggling fish for the purpose of attracting predatory fish thereto. This development makes use of the relatively low frequency sonar signals given off by the mechanical movement of a fish to attract predatory fish. Such a concept would hardly be likely to attract rodents and would, in fact, would be more likely to repel rodents for fear of danger to their own lives.

Moe disclosed in U.S. Pat. No. 3,328,908 an ultrasonic test control device for exterminating undesirable animals such as rodents. An ultrasonic signal having a deleterious effect on the nervous system of a rodent is generated so that the ultrasonic sounds envelope a given area. A series of shelters for the animals are provided within the area enveloped by the ultrasonic sound waves which shelters constitute traps for the animals. Such an arrangement, if it is not to be used simply as a repellant requires the provision of shelters readily accessible to the rodents, and positioned such that the rodents will seek refuge therein rather than simply running away from the ultrasonic sound source. Other devices for repelling undesirable fish is disclosed in Thomas et al, U.S. Pat. Nos. 3,524,276 and for repelling insects in White, 3,891,962. None of the devices disclosed in these patents provide a device which will result in the substantial elimination of undesirable animals from a given locality.

Accordingly, it is an object of this invention to provide a method and apparatus for attracting undesirable animals to a pre-selected location by generating ultrasonic signals corresponding to the instinctual vocalization of such animals.

SHORT STATEMENT OF THE INVENTION

Accordingly, this invention relates to a method and apparatus for attracting undesirable animals to a preselected location by generating ultrasonic signals having pre-determined frequencies, time durations and repetition rates which correspond to the instinctual or learned vocalizations of such rodents. In a first embodiment of the invention, a recording is made of the sounds generated by young animals which recording is played back so that mature rodents are attracted to the transducer which generates the reproduced sound signals. The animals are then trapped and appropriately exterminated. In a second embodiment of the invention, a read only memory is selectively addressed to provide output signals to a digital-to-analogue converter. The digital to analogue converter provides a first output to a voltage controlled oscillator which generates a signal having a frequency which depends upon the amplitude of the signal coupled thereto. A second output of the digital-to-analogue converter is coupled to an amplifier to control the amplitude of the output of the amplifier. The output of a voltage controlled oscillator is amplified by the amplifier and coupled to a transducer which reproduces the sound signals generated by the instinctual vocalization of young animals. The mature animals of the species being attracted then seek out the transducer whereupon the mature animals are trapped and appropriately eliminated.

Other objects, features and advantages of the present invention will become more fully apparent from the following detailed description of the preferred embodiments, the appended claims and the accompanying drawings in which:

DETAILED DESCRIPTION OF THE PREFERRED EMBODIMENTS

Figure 1:
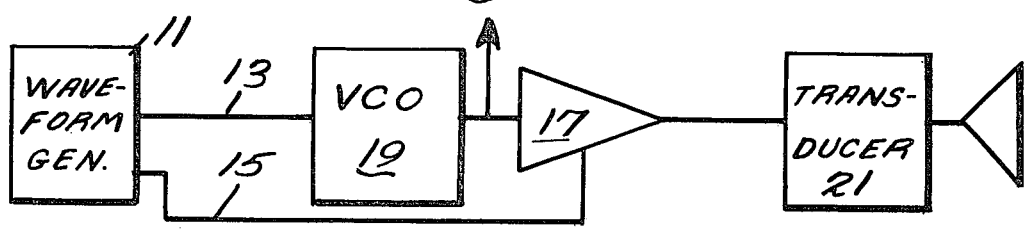
FIG. 1 is a schematic block diagram of a first embodiment of the rodent attraction device of the present invention.

Refer now to FIG. 1 where there is illustrated a first embodiment of the present invention. A wave form generator 11 generates a first signal on line 13 which has an amplitude proportional to the desired frequency of a signal to be generated. The generator provides a second output on line 15 which controls the gain of amplifier 17. Thus the signal on line 15 controls the amplitude of the ultrasonic signal being generated. The signal on line 13 is coupled to a conventional voltage controlled oscillator 19 which provides a variable frequency output which is proportional to the amplitude of the signal on line 13. This variable frequency signal is coupled to the input of amplifier 17. The output of amplifier 17 is coupled to a conventional transducer such as a loud speaker 21 which converts the electrical signal at the output of amplifier 17 to an ultrasonic signal which is broadcast throughout the surrounding area.

Figure 3:
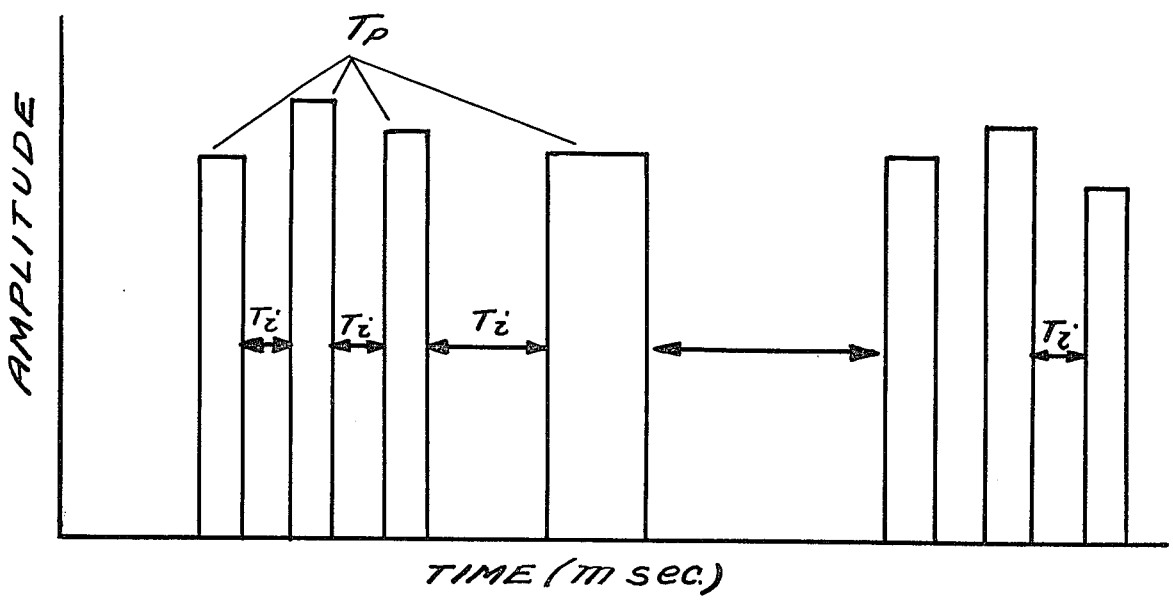
FIG. 3 is a diagrammatic illustration of the wave forms generated by the attraction devices of FIGS. 1 and 2.

Refer now briefly to FIG. 3 which is a diagrammatic illustration of the acoustic signal generated by the transducer 21. The abcissa corresponds to time in milliseconds and the ordinate corresponds to the amplitude of the acoustic signal. In order to attract rodents, for example, the frequency range of pulses generated by the transducer 21 is 30 to 80 kHz. The intensity of the sound is at least 50 dB and the duration of the pulse bursts range from 10 to 120 milliseconds. As can be seen from FIG. 3, the pattern of sound is a relatively rapid succession of pulses with predetermined timed intervals between the pulses and between trains of pulses.

Figure 2:
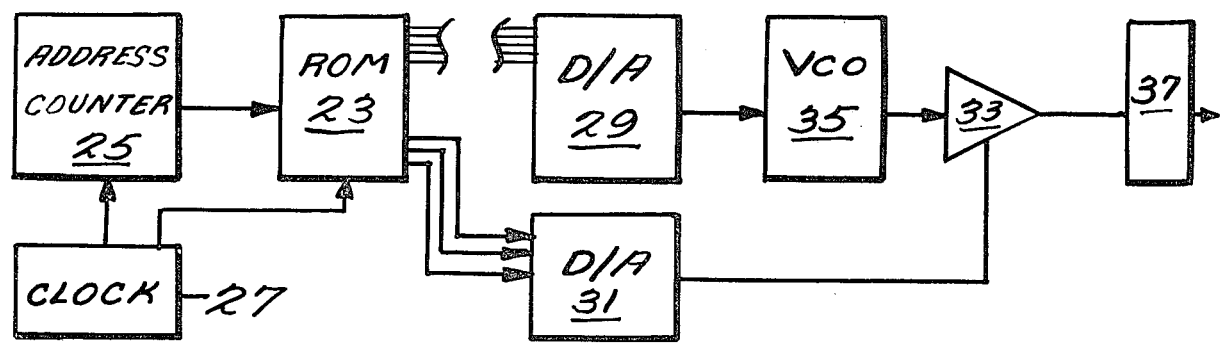
FIG. 2 is a schematic block diagram of a second embodiment of the rodent attraction device of the present invention.

Refer now to FIG. 2 where there is disclosed an alternate embodiment of the attraction device of the present invention. A pre-determined sequence of pulse frequency bursts is stored in digitized manner in a read only memory 23. The information which is stored in the memory 23 in binary digitial form includes frequency information as well as amplitude information. In the preferred embodiment, the information is stored in sequential fashion, so that the stored information can be accessed sequentially by the use of a simple address counter 25 and an appropriate clock pulse source 27. It should be understood, however, that the information could be stored randomly in the memory 23, in which case an appropriate address unit would have to be provided in order to address and access the information in the appropriate sequence. At a first portion of the output of memory 23 is provided pulses in binary coded format, which are coupled to a conventional digital-to-analogue converter 29. The digital/analogue converter converts the pulse signals into an analogue signal having an amplitude which is proportional to the desired frequency of the signal to be generated at any instant in time. A second portion of the output of the memory 23 is a series of digital pulses which are coupled to a second digital-to-analogue converter 31. Digital-to-analogue converter 31 converts the pulses into a signal having a magnitude proportional to the intensity or amplitude of the signal to be generated. The output of the digital-to-analogue converter 31 is coupled to an amplifier 33 to control the gain thereof, in a manner known in the art. The output of the digital-to-analogue converter 29 is coupled to a voltage controlled oscillator 35 which generates an output signal having a frequency which is proportional to the magnitude of the output signal from the digital-to-analogue converter 29. This signal is amplified by amplifier 33 and coupled to a transducer 37, which converts the signal to an acoustic signal which is broadcast about the environment of the transducer.

With reference to FIG. 3, when an interval such as $T_i$ exists which corresponds to an inter-pulse interval, the output of the digital to analogue converter 31 is such that the gain of the amplifier 33 is reduced to substantially zero, whereas during a period $T_p$, which corresponds to a time interval during which a pulse burst frequency exists, the output of the digital-to-analogue converter 31 is such that the amplifier 33 has a high gain. While the wave form illustrated in FIG. 3 is digital in form, that is, the amplifier 33 either has a high gain or substantially no gain, it should be understood that a variable amplitude output signal could be provided, if desirable, and accordingly in such a circumstance, the gain of amplifier 33 would be variable.

In the preferred embodiment, it has been found that the ultrasonic vocalizations of young rodents attract about 50% of the mature lactating females of the same species. Further, it has been found that the ultrasonic sounds do not attract male rodents. With optimization of the system, it is believed that an even greater percentage of female rodents will be attracted, thus reducing substantially the reproduction of the species.

While the present invention has been disclosed in connection with a preferred embodiment thereof, which is utilized to attract rodents such as mice and rats, it should be understood that the concept of the invention could be applied to other animals simply by recording the sounds given off by such animals for the purpose of attracting other animals of the same species. Such sounds would include both sonic and ultrasonic vocalizations and would be generated for the purpose of attracting animals of any species that use auditory communication and of any age or sex. The recording would then be digitized and stored in a read only memory unit such that the signal could be reconstructed and converted to an acoustical sound signal for attracting the desired animal. It should also be understood that there may be other embodiments of the invention which fall within the spirit and scope of the invention as defined by the appended claims.

What is claimed is:

1. An apparatus for attracting mature lactating female animals of a predetermined species comprising:
    a digital memory having stored in predetermined locations therein a binary coded digital representation of signals indicative of vocalized sounds given off by young animals for the purpose of attracting mature lactating female animals of said species;
    means for generating digital signals indicative of the contents of sequential memory locations and for selectively applying predetermines ones of said signals to first and second converting means;
    said first converting means being responsive to selected ones of said digital signals and generating an output signal having a frequency in accordance with the instantaneously applied digital signal; and
    said second converting means being responsive to said first converting means output signal and selected ones of said digital signals, for varying the amplitude of said first converter means output signal in accordance with the instantaneously applied digital signal.

2. The apparatus of claim 1 wherein said first converting means comprises a digital to analog converter receptive of said selected digital signals and a voltage controlled oscillator (VCO) coupled to said digital to analog converter; and
    said second converting means comprises a digital to analog converter, receptive of said selected digital signals, and a variable gain amplifier responsive to said VCO output signal and having applied thereto as gain control signals the output of said digital to analog converter.

3. In an apparatus for attracting animals of a predetermined species of the type comprising means for storing signals indicative of vocalized sounds given off by animals of said species for attracting other animals of said species, and means for converting said stored signals into an acoustical simulation of said vocalized sounds, the improvement wherein:

said means for storing comprises a digital memory having stored in predetermined locations therein a digital representation of said indicative signals; and means for generating digital signals indicative of the contents of sequential memory locations and for selectively applying predetermined ones of said signals to first and second converting means;

said first converting means being responsive to selected ones of said digital signals and generating an output signal having a frequency in accordance with the instantaneously applied digital signal; and said second converting means being responsive to said first converting means output signal and selected ones of said digital signals, for varying the amplitude of said first converter means output signal in accordance with the instantaneously applied digital signal.

4. The apparatus of claim 3 wherein said first converting means comprises a digital to analog converter receptive of said selected digital signals and a voltage controlled oscillator (VCO) coupled to said digital to analog converter; and said second converting means comprises a digital to analog converter, receptive of said selected digital signals, and a variable gain amplifier responsive to said VCO output signal and having applied thereto as gain control signals the output of said digital to analog converter.

* * * * *